H. W. WETZEL.
FLY TRAP.
APPLICATION FILED OCT. 20, 1917.
1,279,951.
Patented Sept. 24, 1918.
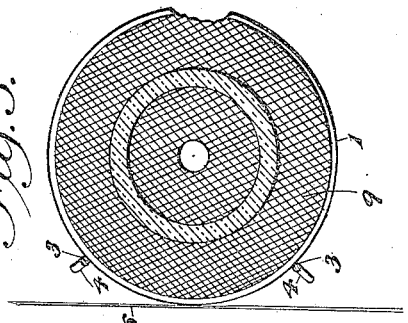
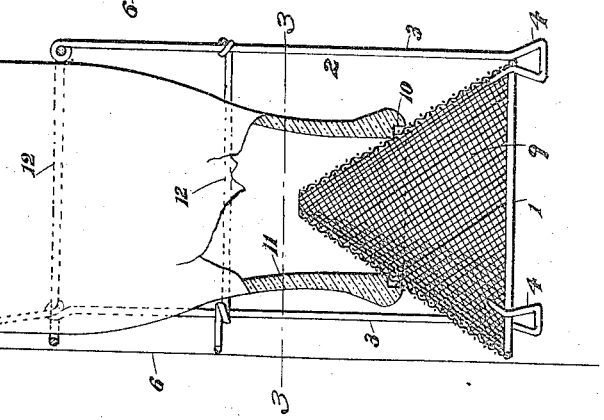
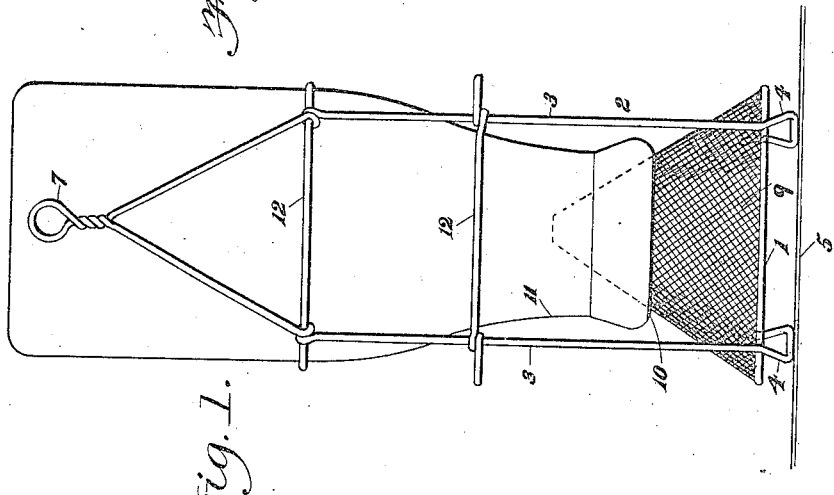
INVENTOR
Henry W. Wetzel,
BY Victor J. Evans
ATTORNEY

UNITED STATES PATENT OFFICE.

HENRY WM. WETZEL, OF PITTSBURGH, PENNSYLVANIA.

FLY-TRAP.

1,279,951.  Specification of Letters Patent.  Patented Sept. 24, 1918.

Application filed October 20, 1917. Serial No. 197,688.

*To all whom it may concern:*

Be it known that HENRY W. WETZEL is a citizen of United States, residing at 238 Shady avenue, Pittsburgh, in the county of Allegheny and State of Pennsylvania, have invented new and useful Improvements in Fly-Traps, of which the following is a specification.

This invention relates to insect traps, and has for its general object to provide a simple and efficient device of this character chiefly adapted for catching flies, bugs and the like, in a sanitary yet efficient manner.

Another object of the invention is to provide an insect trap embodying a substantial and economically fabricated structure, wherein the parts thereof are of a removable nature, so that the said parts may be maintained in a thoroughly cleansed and sanitary condition.

To this end, the invention comprises, among other features, an insect trap wherein is provided a frame, preferably formed from bent wire, and capable of being either suspended from a vertical wall, or to be firmly positioned upon a horizontal support. A conical wire-mesh device is supported by the lower end of the frame and is provided with open extremities to permit of the passage of insects therethrough, and a receptacle, usually an ordinary milk bottle, is adapted to be positioned upon the apex of the dome, so that the latter will extend within the interior of the bottle, whereby insects passing through said dome will be caged within the interior of said bottle, and effectively prevented from escaping.

For a further disclosure of the invention, reference is to be had to the following description, and to the accompanying drawing, forming a part of the present specification, and in which—

Figure 1 is a front elevation of the insect trap, comprising the preferred form of the present invention, the trap having been shown as mounted upon a horizontal support.

Fig. 2 is a vertical sectional view taken through the trap, illustrating the method of suspending the same from a vertical wall, and Fig. 3 is a horizontal sectional view taken along the line 3—3 of Fig. 2.

Similar characters of reference denote corresponding parts throughout the several views of the drawing.

Referring more particularly to the drawing, the numeral 1 designates the fly trap comprising the preferred form of the invention, the same including a supporting frame 2, formed from bent wire or any other suitable material. The frame includes spaced vertically extending uprights or legs 3, which terminate at their lower ends in supporting feet 4, whereby the frame as a whole may be readily positioned upon a horizontal support 5. However, if it is desired to suspend the frame from a vertical wall 6, the frame is provided at its upper extremity with an eye 7 which is adapted to receive a hooked element 8 projecting from the wall, whereby the frame is securely retained in the suspended position, shown in Fig. 2.

Positioned within the frame 2, and connected in any suitable manner with the supporting feet 4, is the entrance dome 9 of the trap, the dome being preferably constructed from wire mesh material and substantially conical in contour. The dome is of hollow construction and is formed to provide open upper and lower extremities. The open apex of the dome is adapted to be positioned within the mouth 10 of an insect receptacle or cage 11, the latter being preferably in the form of an ordinary milk bottle, although other receptacles of similar nature may be employed with equal facility. However, a milk bottle is preferably used inasmuch as it will serve to reduce the cost of the trap; simply the frame and dome being sold, as the milk bottle can be supplied by the purchaser and placed in an operative position when the trap is set up for use.

When in position the receptacle 11 rests upon the sloping walls of the dome 9, and the receptacle is maintained in this position by providing the frame 2 with circular sections 12, which are adapted to embrace the sides of the receptacle so as to prevent undue lateral movement of the latter, and to prevent its accidental displacement. The interior wall of the receptacle has a suitable form of liquid bait coated thereon, and said bait may be of any suitable character, either poisonous or non-poisonous, or the same may be in a powdered or solid form, as will be readily understood.

In operation, flies are adapted to enter the trap through the dome 9, by crawling up the inclined walls of the latter and through the opening in the top thereof, so as to gain access to the interior of the receptacle 11.

Due to the limited area of the open upper end of the dome, it will be impossible for insects once entering the trap to unduly escape therefrom. When the receptacle is filled, the insects contained therein may be destroyed in any suitable manner, for instance, by filling the receptacle with water.

Having described the invention what is claimed as new and patentable is:

An insect trap comprising a wire-like receptacle-supporting frame, said frame including uprights forming supporting legs at their lower ends, with a plurality of the uprights forming an attaching eye at their upper ends, circular elements connecting said uprights, and a conical dome carried on said frame adjacent said supporting legs and held thereby, said dome with said circular elements supporting said receptacle in an inverted position on the frame, with a portion of the dome extending into the receptacle.

In testimony whereof I affix my signature.

HENRY WM. WETZEL.

Copies of this patent may be obtained for five cents each, by addressing the "Commissioner of Patents, Washington, D. C."